(12) United States Patent
Craik

(10) Patent No.: US 11,740,947 B2
(45) Date of Patent: *Aug. 29, 2023

(54) RESILIENT ADAPTIVE BIASED LOCKING IN MULTI-THREAD CONCURRENT PROGRAM EXECUTION

(71) Applicant: International Business Machines Corporation, Armonk, NY (US)

(72) Inventor: Andrew James Craik, North York (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/752,988

(22) Filed: May 25, 2022

(65) Prior Publication Data

US 2022/0283879 A1    Sep. 8, 2022

Related U.S. Application Data

(63) Continuation of application No. 16/697,796, filed on Nov. 27, 2019, now Pat. No. 11,409,578.

(51) Int. Cl.
*G06F 9/46*     (2006.01)
*G06F 9/52*     (2006.01)
*G06N 20/00*    (2019.01)

(52) U.S. Cl.
CPC ............... *G06F 9/52* (2013.01); *G06N 20/00* (2019.01)

(58) Field of Classification Search
CPC ...................................................... G06F 9/52
See application file for complete search history.

(56) References Cited

PUBLICATIONS

List of all IBM related dockets, 2022.

*Primary Examiner* — Gregory A Kessler
(74) *Attorney, Agent, or Firm* — Garg Law Firm, PLLC; Rakesh Garg; Michael O'Keefe

(57) ABSTRACT

A computer-implemented method and system for resilient adaptive biased locking. The method includes adding, in a system including an adaptive lock reservation scheme having a learning state, a component comprising a per class counter that counts, collectively, a number of learning failures and a number of revocation failures. An embodiment includes initializing the per class counter upon loading a class with a predetermined value representing at least one of a maximum number of learning failures and cancellation instances associated with the class. An embodiment includes initializing, based on a determination of an operational state of the per class counter for an object transitioning from one of the learning state and a biased state to a flatlock state, a lock word of the object directly to the flatlock state while bypassing the biased state.

20 Claims, 6 Drawing Sheets

RESILIENT ADAPTIVE BIASED LOCKING IN MULTI-THREAD CONCURRENT PROGRAM EXECUTION

TECHNICAL FIELD

The present invention relates generally to data processing systems, and more particularly, to access control mechanisms for shared resources in a computing environment.

BACKGROUND

Modern computer systems employ multiple processing units to allow different application threads to execute concurrently. Communicating between these parallel threads of execution is a complex undertaking requiring care to ensure correctness and determinism in the set of possible program states observed. One of the most challenging aspects of this communication is the implementation of mutual exclusion using locks.

Mutual-exclusion locking is used for protecting shared resources in concurrent program execution, especially in regard to managed languages such as Java and .NET, where locking is built into the language syntax. Java and .NET alike mandate that any object can act as a lock at any time, imposing additional per-object storage for lock state. Such readily accessible and usable feature availability encourages programmers to use locks more freely than in C-like languages. However, over-use or imprudent use based on such ready access to locking by users can adversely affects system performance. Biased locking is a technique used to address performance issues associated redundant locking, by reducing computational overhead associated with acquiring a lock that is thread-local.

Acquiring a lock is a computationally expensive operation, requiring use of special processor instructions to atomically set values in memory or to make writes visible to other CPUs ("fences"), but such instructions are not cheap to run. Some techniques are directed to optimizing locks by reducing the cost of acquiring locks, including compiler optimizations to eliminate redundant locks. but operating on a per unit of compilation basis. Other techniques focus on optimizing the performance of lock sequences themselves, for instance making the sequences more efficient in order to minimize the use of expensive central processing unit (CPU) operations, via lock reservation.

Lock reservation is a lock optimization scheme wherein the system assumes that a lock being reserved is normally only taken by a single thread. This pattern of single threaded locking often occurs in programs written in Java where synchronized methods require mutual exclusion for the code in a method. But many of the classes using synchronized methods are only ever accessed on a single thread. Lock reservation, or biased locking as it also known, aims to make it inexpensive for a thread to repeatedly acquire a given lock, but this performance improvement comes at the cost of making it much more expensive for another thread to acquire the lock.

The acquisition of a reserved lock by another thread is known as a reservation cancellation and generally requires the thread requesting the cancellation to block until the reserving thread has unlocked the object and halted execution to allow for the lock ownership to be transferred.

One scheme for minimizing reservation cancellations is the Fine-grained Adaptive Biased Locking (FABLE) lock reservation system. In FABLE, reservation cancellation is reduced by adding a learning state between the lock being unlocked and reservation eligible and the lock being reserved to a specific thread. During the learning phase if another thread acquires the lock a cancellation is not required, but the lock transitions from the learning state to a flatlock state which prevents future reservation attempts. A lock in the learning state will transition to being reserved if the same thread has acquired the lock n times without another thread acquiring it. The net affect of this heuristic is reduced reservation cancellations—locks taken by many threads will transition to the flat lock state before being reserved.

SUMMARY

The illustrative embodiments provide a method, system, and computer program product. An embodiment includes adding, in a system including an adaptive lock reservation scheme having a learning state, a component comprising a per class counter that counts, collectively, a number of learning failures and a number of revocation failures. An embodiment includes initializing the per class counter upon loading a class with a predetermined value representing at least one of a maximum number of learning failures and cancellation instances associated with the class. An embodiment initializing, based on a determination of an operational state of the per class counter for an object transitioning from one of the learning state and a biased state to a flatlock state, a lock word of the object directly to the flatlock state while bypassing the biased state. Another embodiment includes, upon detecting that at least one of the number of learning and revocation failures is zero, transitioning directly to the biased state.

An embodiment includes a computer usable program product. The computer usable program product includes one or more computer-readable storage devices. Program instructions stored on at least one of the one or more storage devices are executable in one or more processors to provide for resilient adaptive biased locking in an adaptive lock reservation scheme implemented in execution of an application program.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide for resilient adaptive biased locking in an adaptive lock reservation scheme implemented in execution of an application program.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
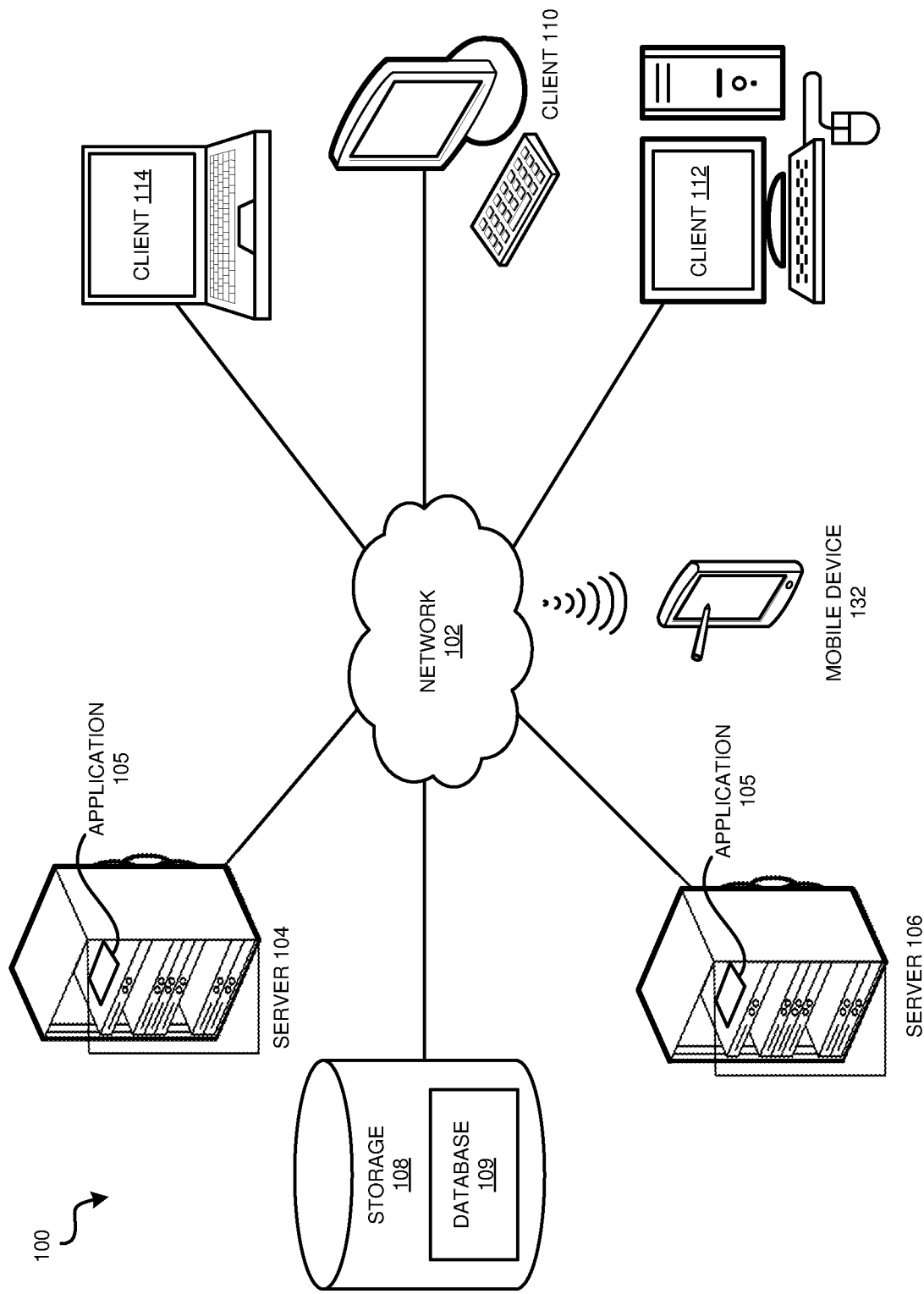
FIG. 1 depicts a block diagram of a network of data processing systems in which illustrative embodiments of resilient adaptive biased locking in multi-threading based execution of an application program are implemented.

The illustrative embodiments recognize that there is a need for resilient adaptive biased locking mechanisms that provide efficient and responsive multi-threading based execution of application programs. Embodiments herein provide mechanisms for including an adaptive lock reservation scheme with a learning state that reduces reservation cancellations, thereby minimizing biased locking overhead, and increasing throughput in application execution.

Embodiments herein recognize that the two highest costs in adaptive biased-locking schemes are the cost of a reservation cancellation and the cost of learning states designed to reduce cancellations of lock reservations. Learning states are directed to reducing the need to cancel reservations on locks acquired by multiple threads. However, while cheaper than a full reservation, even learning states have a pathlength or throughput cost associated therewith, albeit lower than the cost of a reservation cancellation, thus detracting from the learning state as a net system performance advantage. While lock reservation improves performance in application programs, it should generally be used sparingly since it is a global lock state optimization, where objects participating in reservation can originate anywhere in the system since reservation is generally done based on object type. Further, it is important to have strong control heuristics to deter repeated reservation cancellation.

Embodiments herein recognize that the FABLE lock reservation system operates on a per object basis. This means that each object must transition through the learning state to either the flat lock state or the reserved state. The transition through the learning state is wasteful if all the objects of a given class should always be reserved (for instance, they are not locked by multiple threads) or if they should never be reserved because they are always acquired by multiple threads. In particular, the FABLE learning state is not computationally cost free, as lock acquisition sequences need to accommodate the transient learning state and each newly allocated object must transition through the learning state shortly after initialization, representing an infrequently executed path which is not as well optimized as a flatlock or biased lock acquisition sequence due to its rarity per object. Further, embodiments deter pathological systems where the number of same-thread lock acquisitions are enough for the lock to transition to the biased state before other threads begin to acquire the lock, resulting in repeated cancellation despite the learning state.

Yet further, embodiments herein recognize that in producer-consumer systems where instances of one or more data types are used simply to share data between threads in a disposable manner, objects may transition through the learning state, saving a reservation only to have it deallocated a short time later. In such situations, the learning cost is significant, representing a non-trivial portion of the total locking pathlength for the object over its lifetime.

Yet further, embodiments herein also recognize that single-threaded use of instance of classes with synchronized methods can occur frequently. In such situations, the learning cost is also significant overhead— the path length for the learning state being higher than the sequence needed if the object was reserved at allocation or on first lock acquisition.

Other technical advantages and benefits described include, in embodiments, extensions to existing techniques, including the FABLE algorithm, to provide the ability for a newly allocated object to bypass the learning state and transition directly to the flatlock state or a reserved state using a special bit patterns in the lock word. Another advantageous embodiment includes transition from direct to biased, either biased on first reservation, for instance, first to acquire, or biased at allocation upon reserve to the thread that allocates the object. Embodiments further provide a per class multithread access counter usable to determine whether a newly allocated object's lockword should be initialized to the clear or flatlock state. This scheme reduces the overhead of per object learning for types that undergo frequent learning failure or frequent revocation eliminating one class of pathological behaviours still possible with, for instance, the FABLE algorithm, despite the introduction of the learning state for locks. In addition, embodiments provide an intraprocedural optimization to omit the initial transition to the learning state when compile-time analysis shows the allocating thread will acquire, or is likely to acquire, the lock before any other thread.

Illustrative embodiments herein eliminate or minimize the latter problems with existing approaches, including the FABLE protocol, and provide mechanisms for including an adaptive lock reservation scheme with a learning state that reduces reservation cancellations, thereby minimizing bias locking overhead, and increasing throughput in application execution.

An embodiment can be implemented as a high performance application constituted of any combination of hardware and software program instructions. The application implementing an embodiment can be configured as a modification of existing server computing devices or systems, or as a separate application that operates, in some embodiments in parts, in conjunction with local or remote server devices, or some combination thereof.

A method of an embodiment described herein, when implemented to execute on a multi-server or a cloud network based data processing system, comprises substantial advancement of the functionality of that device or data processing system that utilizes Without the embodiment methods and systems provided herein, adaptive biased locking mechanism would still be subject to computational cost penalties associated with a pathlength or throughput cost of the learning state, thus computationally detracting from the learning state as a net system performance advantage in application execution.

The illustrative embodiments are described with respect one or more applications that are constituted of any combination of hardware and software program instructions, including applications installed on server devices and systems that under concurrent and inter-processor execution, enable resilient adaptive biased locking that provides efficient and responsive multi-threading based execution of application programs. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using an application at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
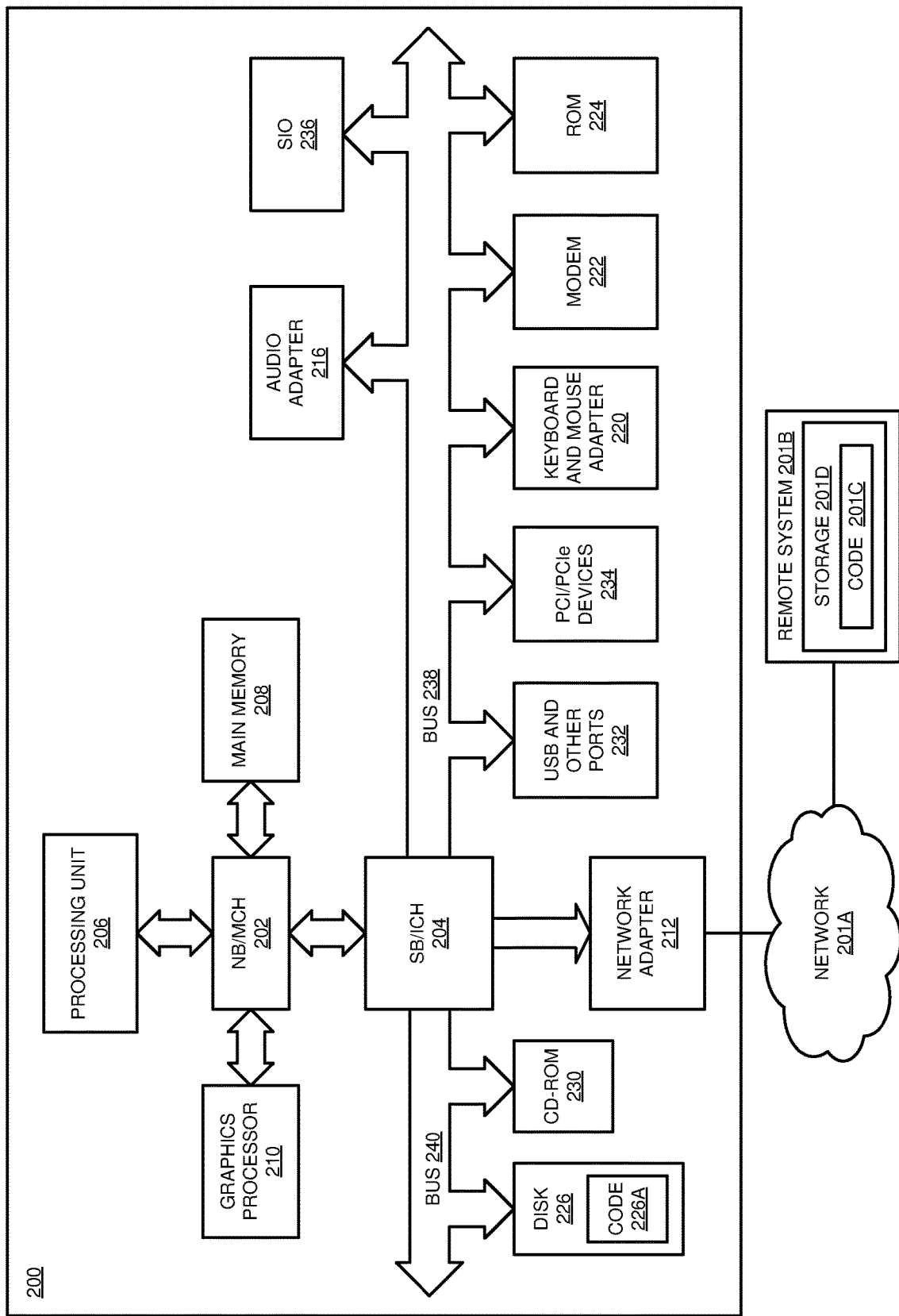
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments of resilient adaptive biased locking in multi-threading based execution of an application program are implemented. Data processing environment 100 is a network of computers in which the illustrative embodiments are implemented and includes both cloud based and edge based compute resources and devices. Data processing environment 100 includes network 102. Network 102 is the medium used to provide communications links between various cloud and edge devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 112, 114 and 132 are edge computing devices also coupled to network 102. A data processing system, such as server 104 or 106, or clients 112, 114 and 132 may contain data and may have software applications or software tools executing thereon.

Only as an example, and without implying any limitation to such architecture, FIG. 1 depicts certain components that are usable in an example implementation of an embodiment. For example, servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application program 105 can be a high performance application under execution at servers 104, 106, and comprised of any combination of hardware and software program instructions executable in one or more processors. Application program 105 can execute in servers 104 and 106, in conjunction with storage unit 108 coupled to network 102 using wired connections, wireless communication protocols, or other suitable data connectivity.

In the depicted example, server 104 provides data, such as boot files, operating system images, and applications to clients 112, 114. Clients 112, 114 and mobile device 132 are be edge computing client devices to server 104 in this example. Clients 112, 114 as well as device 132 may include their own data, boot files, operating system images, and applications. Data processing environment 100 may include additional servers, clients, and other devices that are not shown.

In the depicted example, cloud based data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing inter-processing communications between application executing at one or more applications at server devices 104, 106. Data processing environment 100 may also be used for implementing a client-server environment in which the illustrative embodiments may be implemented. A client-server environment enables software applications and data to be distributed across a network such that an application functions by using the interactivity between a client data processing system and a server data processing system. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 can be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
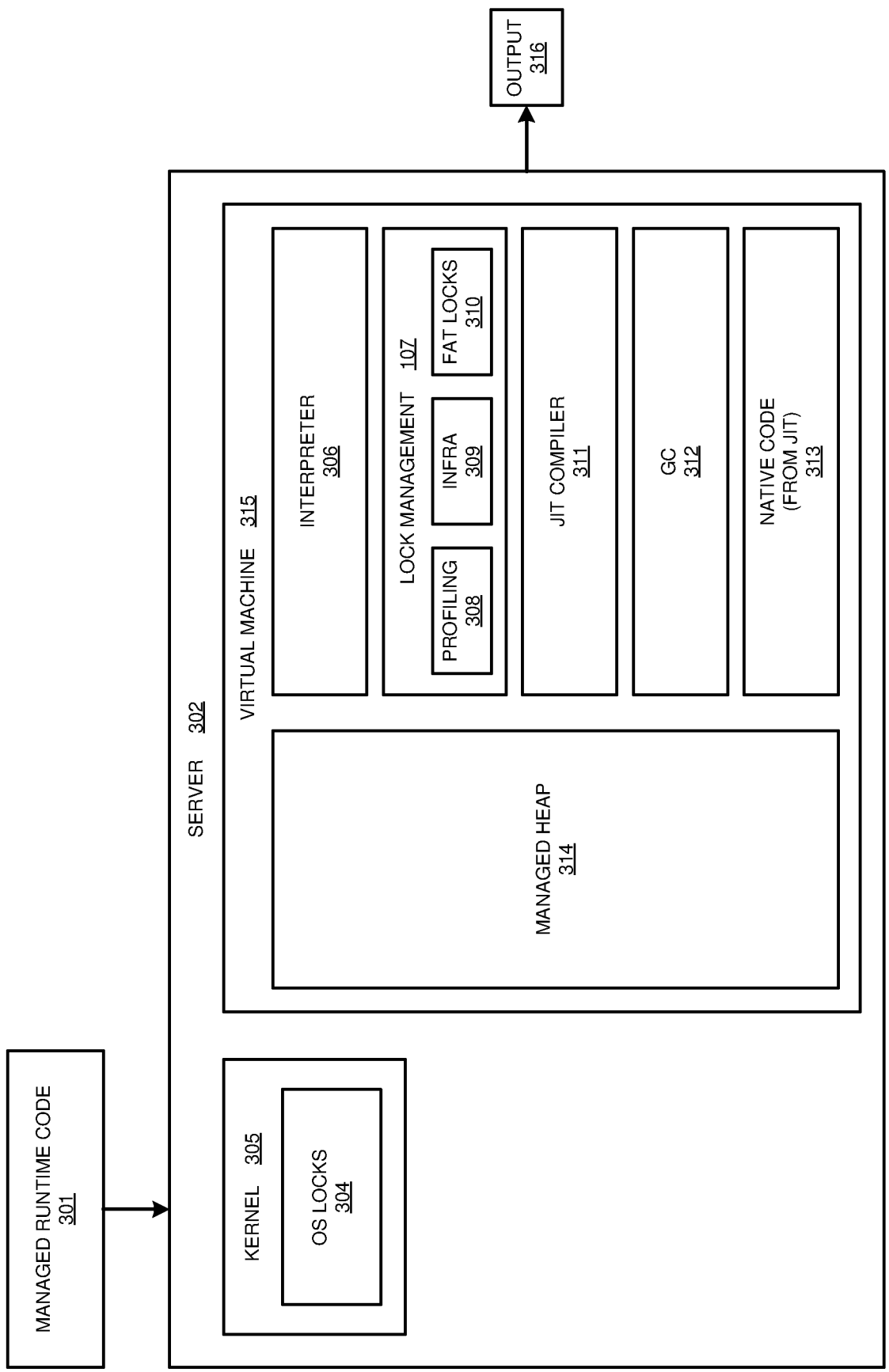
FIG. 3 depicts, in an illustrative embodiment, functional blocks in an architecture for implementing resilient adaptive biased locking.

FIG. 3 depicts, in an illustrative embodiment, a functional block diagram of an architecture implementing resilient adaptive biased locking in multi-threading based execution of an application program. In an embodiment in accordance with FIG. 3, managed runtime code 301, constituted in an application program, and comprises executable program instructions stored on one or more storage devices of server 302 for execution by one or multiple processors. Server 302 can correspond in embodiments to server 104, 106 of FIG. 1. Server 302 is configured with kernel 305 that includes OS locks 304, and Java virtual machine (JVM) 315, also referred to herein as virtual machine 315.

JVM/virtual machine 315 includes managed heap 314, interpreter 306, lock management 307, just in time (JIT) compiler 311, garbage collector (GC) 312 and native code 313 based on output from JIT compiler 311. Managed runtime code 301 is executed by virtual machine 315 to produce program output 316 at server 302.

Lock management 307 of virtual machine 315 includes profiling component 308 to assess how the locks are behaving or performing, infrastructure component 309 for managing the flat locks as described in the embodiments herein, and fat locks component 310 for inflated lock management, such as for managing the OS monitors needed for true contention.

Interpreter 306, JIT compiler 311 and native code 313 use lock management 307. Lock management 307 uses OS locks 304 provided by kernel 305. Interpreter 306 in conjunction with native code 313 update lock words on objects allocated in managed heap 314.

Garbage collector (GC) 312 is typically used for garbage collection to reclaim unused memory from all the regions in JVM managed heap 314. Managed heap 314 is the area of memory used for dynamic allocation. Once an object is no longer referenced and therefore is not reachable by the application code, garbage collector 312 removes it, reclaims the unused memory, and reuses it for future object allocation. This means there is no explicit deletion and no memory is given back to the operating system. All objects are allocated on the managed heap area 314 managed by the JVM 315.

Figure 4:
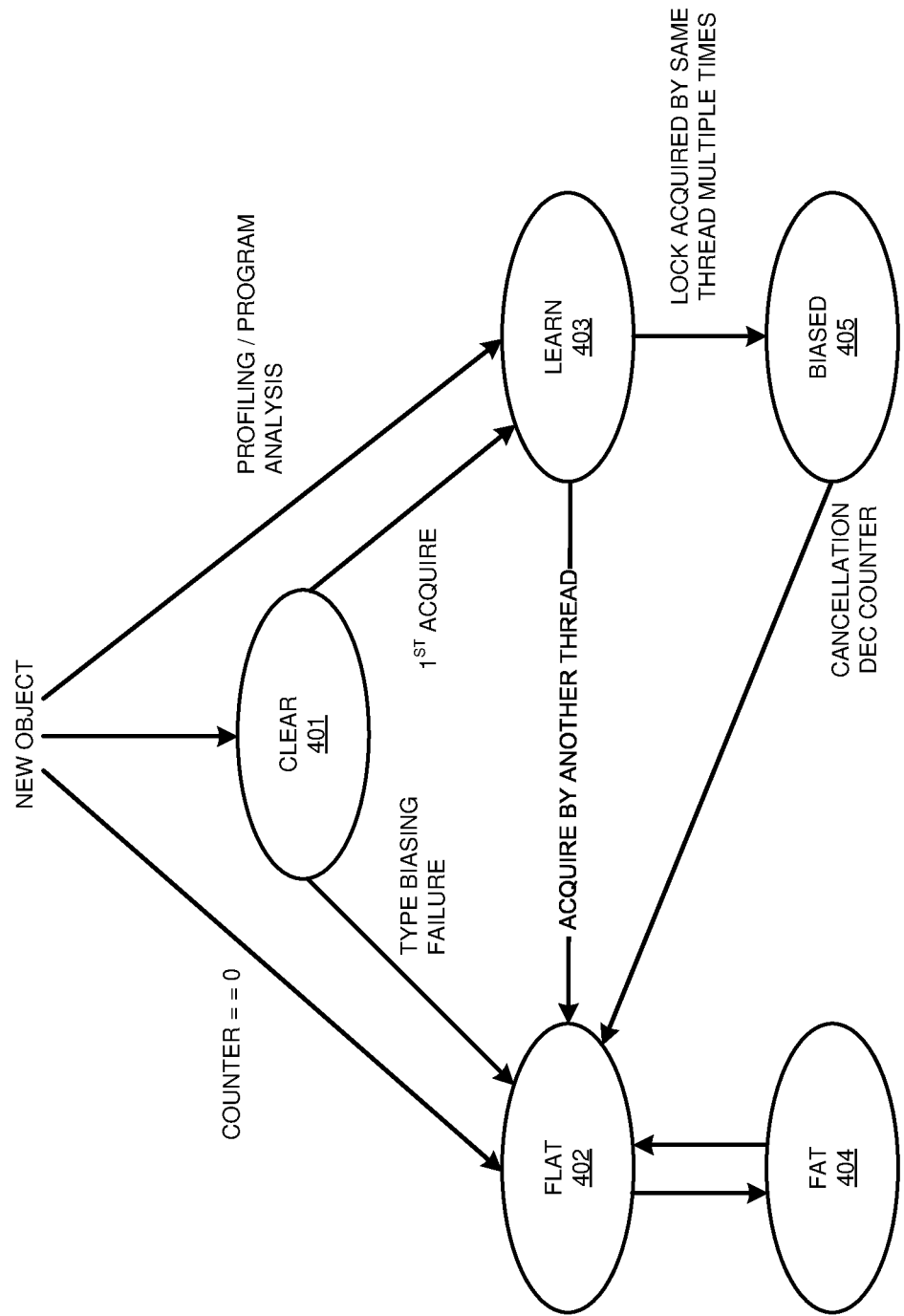
FIG. 4 depicts, in an illustrative embodiment, a state transition diagram implementing resilient adaptive biased locking.

FIG. 4 depicts, in an illustrative embodiment, a lock state transition diagram in implementing resilient adaptive biased locking in accordance with embodiments described herein.

Based on a new object being allocated by the JVM services, locks in the resilient adaptive biased locking scheme described in embodiments herein start out in clear state 401, and transition from clear state 401 to learn state 403 upon a first lock acquisition. The learn state 403 is used for learning whether the lock will become shared. While in learn state 403, if the lock is acquired multiple times by the same thread, the lock transitions to biased state 405 and gets biased to that thread. Locks in clear state 401 can transition to the flatlock, or flat, state 402 based on a type biasing failure.

Further based on the new object being allocated, a per class counter is decremented for any object transitioning from the learn state 403 and biased state 405 to flat state 402. While in learning state 403, if the lock is subjected to an acquisition attempt by another thread, the lock transitions to flat state 402. Yet further, once the object is allocated, locks in the resilient adaptive biased locking scheme described in embodiments herein can directly start out in learn state 403 based on profiling in conjunction with program analysis. In implementing the resilient adaptive biased locking embodiment herein, the lock word of the object is initialized directly to the flatlock state, bypassing biasing states, in response to a determination that the per class counter is decremented to zero. In embodiments, the determination that the per class counter is decremented to zero is based on modifying object allocation pathways of the system to check the per class counter for the object.

From flat state 402, the lock transitions to fat state 404 when lock inflation is determined based on heuristics used, for instance when a history of contention is established, and several threads trying to take the lock simultaneously, or a lock that has been waited on, such as for notification. The lock can transition from fat state 404 to flat state 402 in cases of lock deflation depending on heuristics applied.

Embodiments herein eliminate the problems of the existing algorithm or protocol solutions, including the FABLE protocol, based at least in part upon increasing the throughput of application programs under execution by reducing lock acquisition overhead, in comparison to those existing locking protocols.

Figure 5:
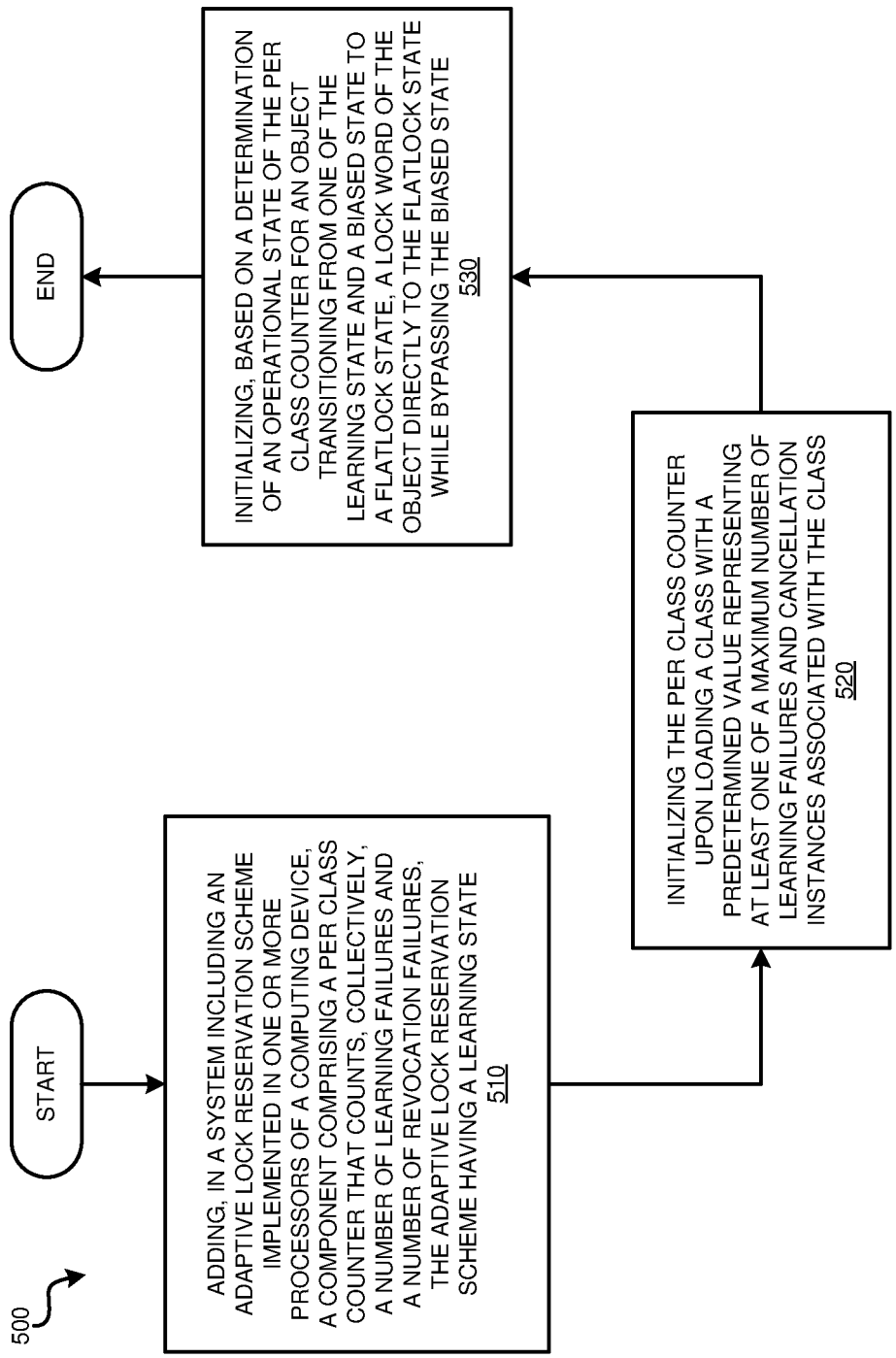
FIG. 5 depicts a flowchart, in an illustrative embodiment of resilient adaptive biased locking in multi-threading based execution of an application program.

FIG. 5 depicts a flowchart, in an illustrative embodiment 500 of resilient adaptive biased locking in multi-threading based execution of an application program. In some embodiments, steps described in reference to FIG. 5 can be performed in conjunction with the techniques described with regard to FIGS. 1-4.

At block 510, adding, in a system including an adaptive lock reservation scheme implemented in one or more processors of a computing device, a component comprising a per class counter that counts, collectively, a number of learning failures and a number of revocation failures, the adaptive lock reservation scheme having a learning state.

At block 520, initializing the per class counter upon loading a class with a predetermined value representing at least one of a maximum number of learning failures and cancellation instances associated with the class.

At block 530, initializing, based on a determination of an operational state of the per class counter for an object transitioning from one of the learning state and a biased state to a flatlock state, a lock word of the object directly to the flatlock state while bypassing the biased state.

In one embodiment that minimizes computational overhead related to the learning state, upon detecting that at least one of the number of learning and revocation failures is zero, transitioning directly to the biased state.

In one aspect, the operational state of the per class counter relates to one of decrementing a count, incrementing a count, and updating a count when scanning a heap of a garbage collector component implemented in a memory communicatively accessible to the one or more processors. In a related aspect, the method includes, when the operational state of the per class counter relates to decrementing the count, upon the object being instantiated, the determination that the per class counter is decremented to zero is based on modifying object allocation pathways of the system to check the per class counter for the object.

In yet another embodiment, the operational state of the per class counter relates to one of decrementing a count, incrementing a count, and updating a count when scanning a heap of a garbage collector component implemented in a memory communicatively accessible to the one or more processors. In one variation, the per class counter is re-set periodically.

In embodiments, the per class counter counts, collectively, the number of learning failures and the number of revocation failures. This counter is initialized when a class is first loaded with a preset value representing the maximum number of learning failures and/or cancellations we want to permit instances of the class to undergo. The embodiments herein modify state transitions of the FABLE system to include decrementing the class counter for any object transitioning from the learning or biased state to the flatlock state. This counter update does not need to be atomic on systems with a sufficiently strong cache coherency model since precise counting is not required, as it is sufficient that the counter eventually reach zero.

In another aspect, embodiments determine that the per class counter is decremented to zero based on modifying object allocation pathways of the system to check the per class counter for the object. In particular, using the modified object allocation pathways to check the class counter for the object being instantiated to see if the learning failure/cancellation counter has reached zero. If the counter is zero, the lock word of the object is initialized directly to the flatlock state bypassing the biasing states entirely. Further, when generating object initialization sequences at compile-time the compiler can check the counter and omit runtime checks and directly initialize the lockword to the flatlock state if the instance type is known statically and its counter has already reached zero. The overall effect of this adaptive biased locking scheme herein is to reduce the number of objects transitioning through biasing states when they are truly shared, thus reducing computational overhead associated with locking transitions.

In another aspect, the cost of reaching the biased state for locks that are truly acquired only by a single thread is reduced. At compile-time a standard use-def analysis shows what operations use a newly allocated object. If a newly allocated object reaches a lock acquisition (monent bytecode in Java) we can study the operations on all paths from the allocation to the monent. If references to the object do not escape to the heap (or are unlikely to escape to the heap) then we can pre-initialize the new object's lock word to the learning state for the current thread, thus accelerating the learning process. Such optimization can be further augmented by profiling information, if available from the runtime context, to pre-initialize the lock into the learning or biased state based on observed runtime behavior. In an alternate embodiment, another optimization includes reducing the learning count. In another embodiment, yet another optimization includes transitioning to the biased state directly.

Yet another embodiment resets the global class counters to a non-zero value if a phase change in application behavior is detected, allowing the locking system to re-optimize itself for the new patterns of locking after inflection point. This could be done globally or incrementally possibly driven by profiling depending on the features of the runtime system.

Figure 6:
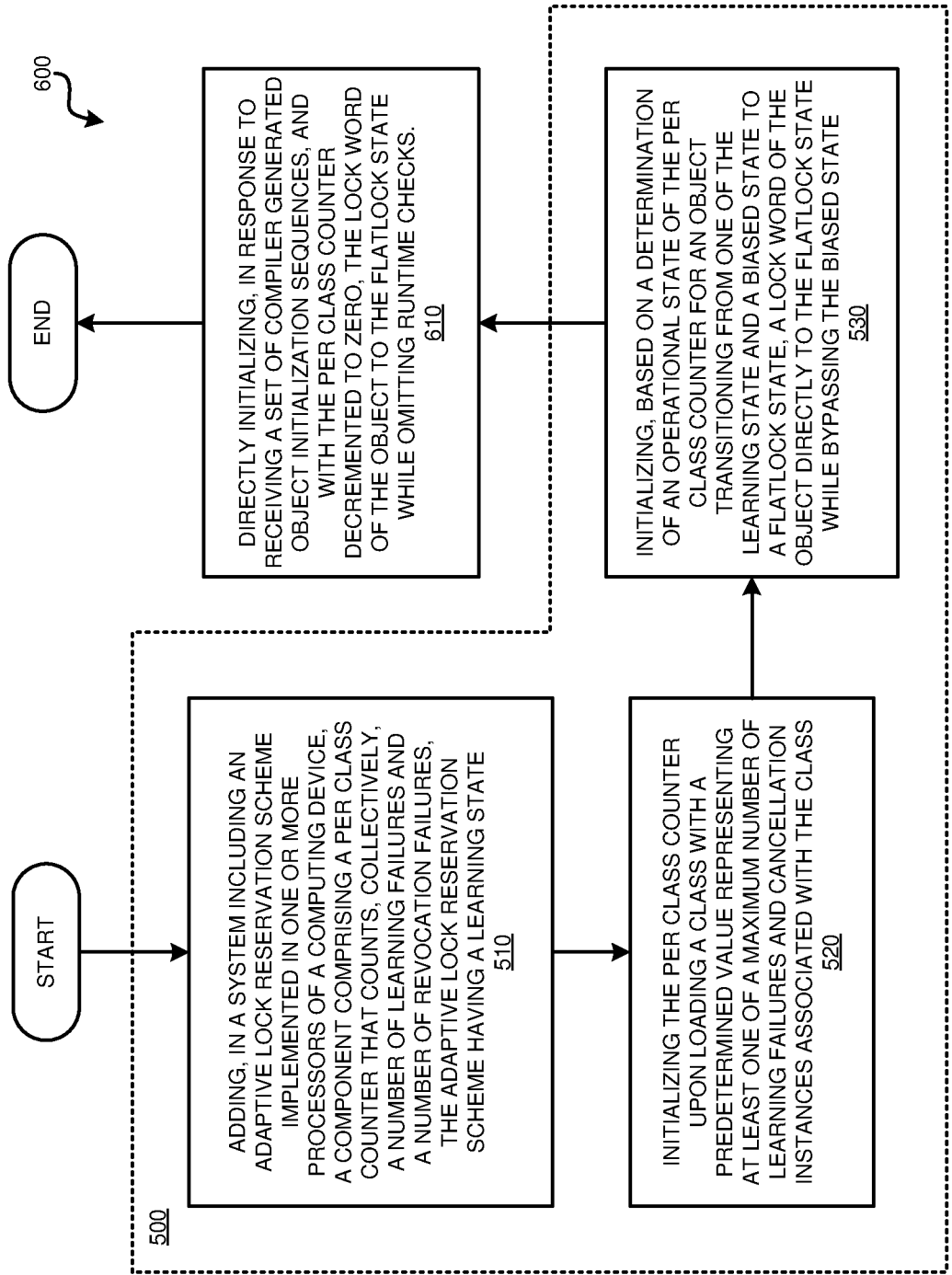
FIG. 6 depicts a flowchart, in another illustrative embodiment of resilient adaptive biased locking in multi-threading based execution of an application program.

FIG. 6 depicts a flowchart, in another illustrative embodiment 600 of resilient adaptive biased locking in multi-threading based execution of an application program. In embodiments, steps described in reference to FIG. 6 can be performed in conjunction with the techniques described with regard to FIGS. 1-5. At block 610, directly initializing, in response to receiving a set of compiler generated object initialization sequences, and with the per class counter decremented to zero, the lock word of the object to the flatlock state while omitting runtime checks.

Thus, a computer implemented method, system or apparatus, and computer program product are provided in the illustrative embodiments for handling high performance inter-processor computing InfiniB and communication faults. Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other lightweight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method for adaptive biased locking, the computer-implemented method comprising:

adding, in a system including an adaptive lock reservation scheme implemented in one or more processors of a computing device, a component comprising a per class counter that counts at least one number (counted number) from a set of numbers, the set of numbers comprising (i) a number of learning failures and (ii) a number of revocation failures, the adaptive lock reservation scheme having a learning state;

initializing the per class counter upon loading a class with a predetermined value representing a maximum number corresponding to the counted number, the maximum number being associated with the class; and initializing, based on a determination of an operational state of the per class counter for an object transitioning from one of the learning state and a biased state to a flatlock state, a lock word of the object directly to the flatlock state while bypassing the biased state.

2. The computer-implemented method of claim 1 further comprising, further comprising:

upon detecting that the counted number is zero, transitioning directly to the biased state.

3. The computer-implemented method of claim 1 wherein the operational state of the per class counter relates to one of decrementing a count, incrementing a count, and updating a count when scanning a heap of a garbage collector component implemented in a memory communicatively accessible to the one or more processors.

4. The computer-implemented method of claim 1 wherein, when the operational state of the per class counter relates to decrementing the count, upon the object being instantiated, the determination that the per class counter is decremented to zero is based on modifying object allocation pathways of the system to check the per class counter for the object.

5. The computer-implemented method of claim 4 further comprising directly initializing, in response to receiving a set of object initialization sequences generated at compile time by a compiler, and with the per class counter decremented to zero, the lock word of the object to the flatlock state while omitting runtime checks.

6. The computer-implemented method of claim 5 wherein a set of compiler generated object initialization sequences is determined at compile-time by the compiler to have an instance type known statically.

7. The computer-implemented method of claim 5 further comprising accelerating, upon determining that the object reaches a lock acquisition, a learning process associated with the learning state for the object by pre-initializing a lock word of the object to the learning state for a current thread.

8. The computer-implemented method of claim 7 further comprising accelerating the learning state for the object in response to determining that a set of references to the object are unlikely to escape to a managed heap of a virtual machine configured in the computing device.

9. The computer-implemented method of claim 1 wherein the learning state is directed, at least in part, to reducing a number of reservation cancellations associated with the adaptive lock reservation scheme.

10. The computer implemented method of claim 1 wherein the per class counter is re-set periodically.

11. The computer-implemented method of claim 1 further comprising resetting a plurality of global class counters to a non-zero value upon detecting a phase change in application behavior, wherein the adaptive lock reservation scheme self-reoptimizes for new patterns of locking after a locking transition.

12. A computer-usable program product comprising one or more computer-readable storage media, and program instructions collectively stored on at least one of the one or more storage media, the program instructions when executed in one or more processors causing operations comprising:
adding, in a system including an adaptive lock reservation scheme implemented in one or more processors of a computing device, a component comprising a per class counter that counts at least one number (counted number) from a set of numbers, the set of numbers comprising (i) a number of learning failures and (ii) a number of revocation failures, the adaptive lock reservation scheme having a learning state;
initializing the per class counter upon loading a class with a predetermined value representing a maximum number corresponding to the counted number, the maximum number being associated with the class; and
initializing, based on a determination of an operational state of the per class counter for an object transitioning from one of the learning state and a biased state to a flatlock state, a lock word of the object directly to the flatlock state while bypassing the biased state.

13. The computer-usable program product of claim 12 wherein claim 1 further comprising instructions causing operations comprising
upon detecting that the counted number is zero, transitioning directly to the biased state.

14. The computer-usable program product of claim 12 wherein the operational state of the per class counter relates to one of decrementing a count, incrementing a count, and updating a count when scanning a heap of a garbage collector component implemented in a memory communicatively accessible to the one or more processors.

15. The computer-usable program product of claim 12 wherein, when the operational state of the per class counter relates to decrementing the count, upon the object being instantiated, the determination that the per class counter is decremented to zero is based on modifying object allocation pathways of the system to check the per class counter for the object.

16. The computer-usable program product of claim 15 further comprising instructions causing operations comprising directly initializing, in response to receiving a set of object initialization sequences generated at compile time by a compiler, and with the per class counter decremented to zero, the lock word of the object to the flatlock state while omitting runtime checks.

17. The computer-usable program product of claim 12 wherein the learning state is directed, at least in part, to reducing a number of reservation cancellations associated with the adaptive lock reservation scheme.

18. The computer-usable program product of claim 12, wherein the stored program instructions are stored in a computer-readable storage medium in a data processing system, and wherein the stored program instructions are transferred over a network from a remote data processing system.

19. The computer-usable program product of claim 12, wherein the stored program instructions are stored in a computer-readable storage medium in a server data processing system, and wherein the stored program instructions are downloaded over a network to a remote data processing system for use in a computer-readable storage medium associated with the remote data processing system, further comprising:
program instructions to meter use of the computer usable code associated with the request; and
program instructions to generate an invoice based on the metered use.

20. A computer system comprising one or more processors, one or more computer-readable memories, and one or more computer-readable storage devices, and program instructions stored on at least one of the one or more storage devices for execution by at least one of the one or more processors via at least one of the one or more memories, the program instructions when executed in the one or more processors causing operations comprising:
adding, in a system including an adaptive lock reservation scheme implemented in one or more processors of a computing device, a component comprising a per class counter that counts at least one number (counted number) from a set of numbers, the set of numbers comprising (i) a number of learning failures and (ii) a number of revocation failures, the adaptive lock reservation scheme having a learning state;
initializing the per class counter upon loading a class with a predetermined value representing a maximum number corresponding to the counted number, the maximum number being associated with the class; and initializing, based on a determination of an operational state of the per class counter for an object transitioning from one of the learning state and a biased state to a flatlock state, a lock word of the object directly to the flatlock state while bypassing the biased state.

\* \* \* \* \*